Nov. 13, 1928.
R. B. WASSON
1,691,746
PISTON RING AND METHOD OF MAKING THE SAME
Filed Dec. 17, 1920   2 Sheets-Sheet 1
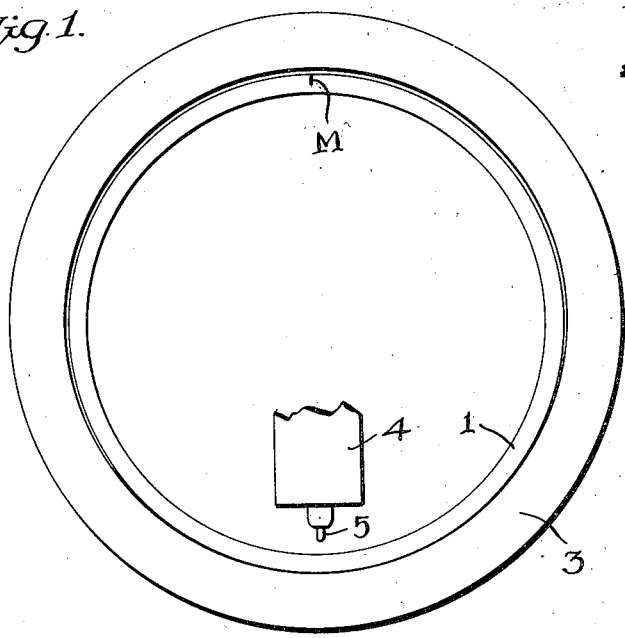
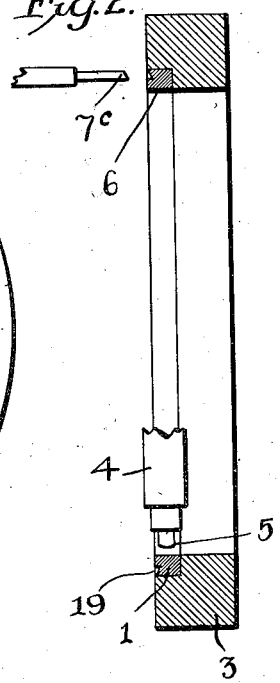
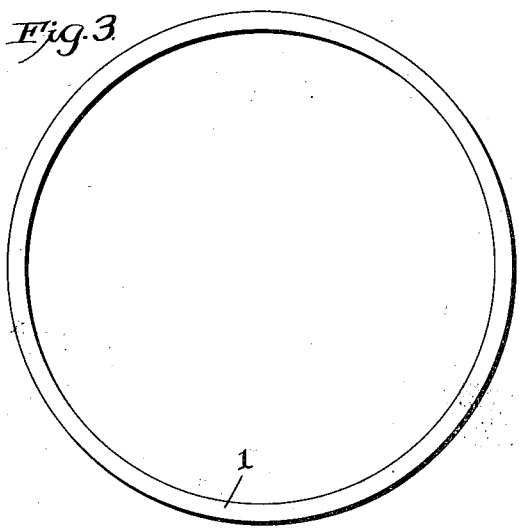
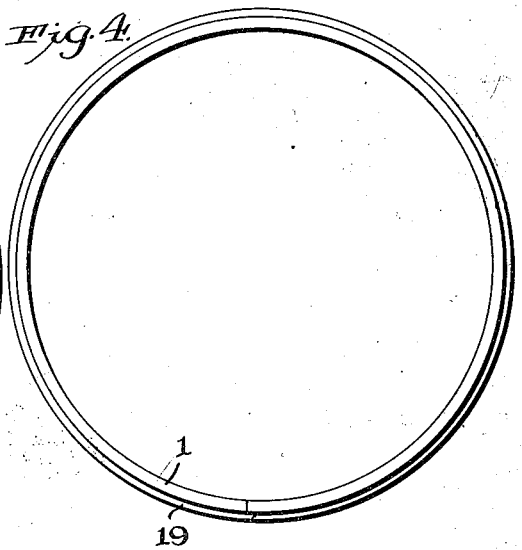
WITNESS:
Geo. A. Senior
INVENTOR
Robert B. Wasson
BY
W. J. Bissing
ATTORNEY Nov. 13, 1928.                                         1,691,746
R. B. WASSON
PISTON RING AND METHOD OF MAKING THE SAME
Filed Dec. 17, 1920        2 Sheets-Sheet 2
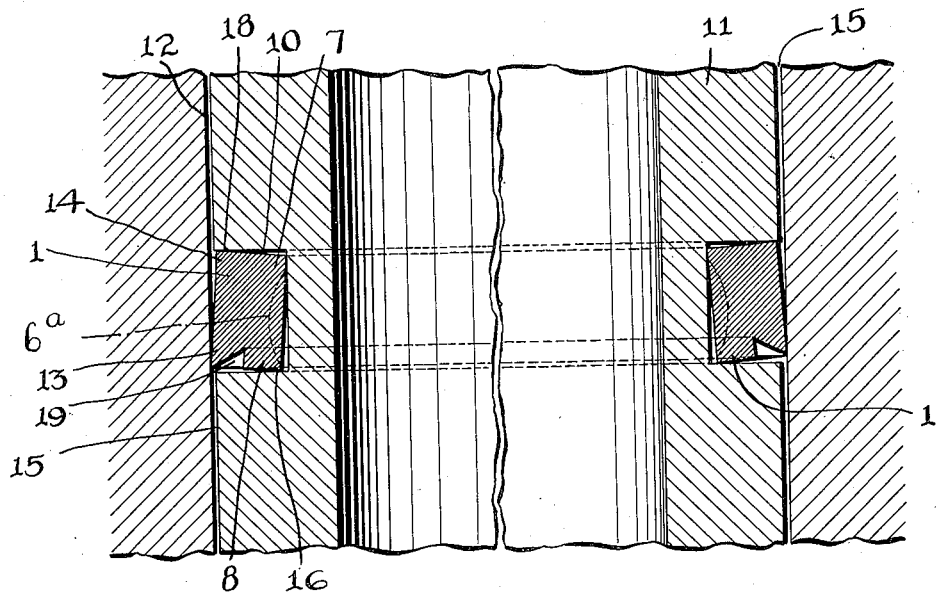
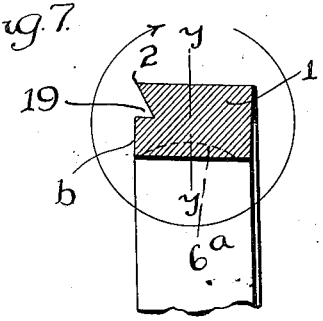
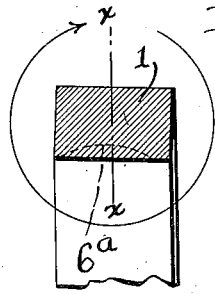
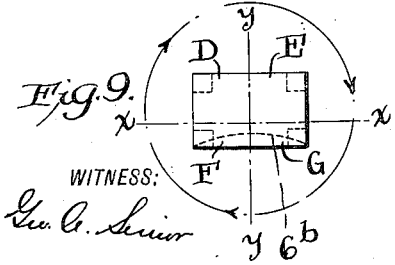
INVENTOR
Robert B. Wasson
BY
ATTORNEY Patented Nov. 13, 1928.

1,691,746

UNITED STATES PATENT OFFICE.

ROBERT B. WASSON, OF CRANFORD, NEW JERSEY.

PISTON RING AND METHOD OF MAKING THE SAME.

Application filed December 17, 1920. Serial No. 431,399.

My invention relates to hammered or peened metal packing or piston rings giving localized pressure and the process of producing them, and more particularly to divided cast iron rings of substantially uniform radial cross section known as concentric rings and the process of producing them, the metal of a circumferential face of which and in particular the inside face, is hammered or peened in order to impart to the rings substantially uniform equal radial outward pressure per unit of circumference when closed to their operating diameters. Such rings are under the stress of the forces due to the condensations of the metal, both while the rings are in a free state and also when confined to circular form.

One of the objects of my invention is to so hammer or peen and shape parts of the metal of such a ring that it will so twist transversely and circumferentially in its free state that when in its groove in the piston which carries it, the ring will be given a correct uniform twist and thus will incline the oil side of the ring outwardly and bring one edge of the ring more firmly to bear against the cylinder wall under the action of the stresses imparted to the ring by the condensations of the metal of the ring. This gives a higher pressure per unit of surface of contact between the ring and cylinder wall, and provides a tighter seal against compression and ensures a better seal against the oil getting by the ring. The ring acts to more or less scrape the oil from the cylinder wall and also to drive the oil lying between the piston and the cylinder wall back into the crank casing, instead of allowing the ring to pass over it.

Fluid back pressure against the piston ring tends to build up in the oil between the piston and the wall of the cylinder. The rings on the piston must accelerate this volume of oil on its downward stroke. Unless the pressure per unit of ring surface bearing against the cylinder wall is greater than the fluid pressure, the oil will tend to deflect the ring at that point and pass, thus relieving the pressure. My invention overcomes this objection.

It will be observed in the case of a peened ring whose radial cross section is of symmetrical shape with respect to a central or middle plane of symmetry passing thru the circumferential neutral axis of the ring and which is peened symmetrically with respect to said plane that stresses are created in the peened regions which when the ring is in its free state set up equal and opposite stresses in the radially opposite unpeened regions or zones. Consequently, when the ring is left free, it opens, different portions of the ring being curved differently, according to the law of hammering or peening the ring. When hammering the ring in accordance with a law which will give uniform radial outward pressure when the ring is confined to circular form, as determined by a suitable ring gage or otherwise, the maximum radius of curvature occurs opposite the split where the maximum blow is dealt and the minimum radius occurs near the split end of the ring. In between the radii vary in accordance with the law of hammering. Furthermore, the peening having been symmetrical with respect to the middle plane of symmetry, the ring lies flat and does not twist when it has been removed from the chuck of the peening machine and is permitted to open. The metal of the ring when the ring is open and in its free state is under the influence of the stresses produced by the hammerings or peenings. When the ring is now confined to a circular shape as when it fits in its place in the piston and cylinder, it, under the action of the stresses referred to, will exert substantially uniform radial pressure outward at all parts of its circumference and the pressure will also be substantially uniform at all points across the face of the ring. The pressure is substantially uniform around the ring and at every point across the curved face of the ring. The ring does not twist.

I have found that by shifting the peening to one side or the other of the middle plane of symmetry, that is to say, the plane of the middle of the ring, I can cause the stresses due to the hammering of the metal to give the ring a variable twist in its free state. The condensations are thus made to a greater degree on one side of the middle plane than on the other. This twist is a maximum per unit of length at the point opposite the split and a minimum per unit of length at the split and variable amounts between. A ring so treated by peening or hammering and thereby peening permanently a zone or portion of the inner side or circle of the ring, when confined in a circular cylinder will assume a uniform transverse twist due to the peening stresses at one side of the middle plane being greater than those at the opposite sides. This uniform twist will be translated into uniform but increased localized pressure at the contacting edge of the ring. Since the ring is of elastic metal and peened or compressed permanently around its entire circle along its inner face and near the adjacent ring side, the resilience of its peened metal tends to lengthen the circumference of the compressed portion of the ring and thus throw the corresponding portion of the ring outwardly beyond the lesser peened portion. The oil side of the ring is thus inclined outwardly. Furthermore, asymmetry of form can be combined with this asymmetry of peening to produce like results, or asymmetry of form can be combined with symmetry of peening to produce the twist. The asymmetry of form is preferably produced by making the radial cross section of the ring asymmetrical. The ring may thus be asymmetrical either with respect to the peening stresses or if the peening stresses are symmetrically imparted to the ring, then the cross section of the ring may be asymmetrical in order to produce the twist and the ring is asymmetrical as to shape. I prefer to provide a portion of the ring with a circumferential sharp edge so as to help scrape the oil from the cylinder wall.

With the above and other objects in view, my invention consists in the parts, improvements, and combinations more fully set forth in the claims.

Turning now to the drawings, Fig. 1 is a front elevation of the ring while in the peening machine, the ring being also shown notched.

Fig. 2 is a cross section of Fig. 1.

Fig. 3 is a plan view of one side of the ring before splitting.

Fig. 4 is a plan view of the reverse side of the ring shown in Fig. 1, after peening and splitting, the ring being supposed to be confined to a circular form. The twist of the ring is not shown.

Fig. 5 is an end elevation of the ring.

Fig. 6 illustrates somewhat exaggerated, the ring in the piston groove in its twisted position.

Fig. 7 is an enlarged cross section of a part of the ring showing its twist.

Fig. 8 is a view of another embodiment of the invention.

Fig. 9 illustrates another embodiment of the invention.

Fig. 10 shows the step of compressing the ring between flat dies.

As illustrated in Fig. 1, the ring 1 while still continuous is placed in the chuck 3 and the metal of the ring peened as by means of peening tool 4 with peening point 5 which peens the ring so as to hammer or compress a part of the metal of the ring along its inner, curved circumferential face 6 and thereby produce a ring giving uniform equal outward radial pressure of a predetermined amount, according to well known practice.

In accordance with my invention I shift the peening point with relation to the middle plane of the ring a predetermined amount so that the ring is peened at all points slightly to one side of the middle plane passing thru the circumferential axis of the ring. The amount of shift controls the amount of twist. The shift is shown exaggerated in the drawing for clearness of illustration. The dotted line $6^a$ indicates diagrammatically the depth and position of the hammer or peening point. One of the circumferential halves of the ring is thus more heavily peened than the other half. One set of radial outward pressures is thus created in the less hammered annular portion 7 of the ring, and a heavier set on the more hammered annular portion 8. The ring under the unbalanced stresses introduced into it by the peening blows will tend to expand outwardly. The ring having been hammered on its inner circumference toward the adjacent ring side $b$, the hammered portion or zone tends to lengthen and the corresponding portion of the ring is thrown outwardly beyond the unhammered portion. The ring will twist transversely as shown in Figs. 5 and 7. This twist is somewhat exaggerated in Fig. 7, where the middle plane of the ring is indicated at Y—Y.

When the ring is placed within the piston groove 10 of the piston 11, being snapped over the piston and thereafter compressed by the cylinder wall 12, the lower edge portion 13 nearest to the crank casing (crank casing not shown) will by the twisting of the ring press more firmly into contact with the cylinder wall (see Fig. 6) than the edge 14 of the ring toward the head of the cylinder (head of the cylinder not shown). When wearing, the ring will continue to twist and its edge will always remain in contact with the cylinder wall giving it localized pressure. The oil which tends to accumulate in the space 15 above the crank case between the cylinder wall 12 and the piston 11 will thus be scraped off the cylinder wall by the ring and will be driven back into the crank case.

The above construction provides a tight seal between the ring and the cylinder wall and also additional sealing between the ring and the piston groove as at 16 and 18.

In order to help to scrape the oil from the cylinder wall and to increase the bearing pressure between the ring and the wall, I prefer to provide the ring with a circumferential sharp edge 2. This may be the unaltered edge of the ring. I prefer, however, to secure a sharp edge by notching the ring as by means of a cutting tool $7^c$, thus making an angular circumferential depression 19 in the flat side of the ring and giving the ring a sharper corner or edge with an angle less than 90 degrees. By so removing the metal I also unbalance the forces resisting the stresses imparted to the ring thus assisting in the twisting action. After notching the ring is placed between suitable dies 20 and pressed so as to give a standard width to the ring (see Fig. 10). The ring is marked at the point M where it is to be split after hammering.

My invention may be carried out in other ways. For example, in the form of ring shown in Fig. 8, the ring is peened along its inner, curved circumferential face, to one side of the plane of the neutral axis or middle plane of the ring, but the ring remains of rectangular cross section and no portion of it is cut away. The middle plane of the ring is lettered XX and the peening is indicated by the dotted line $6^a$. The ring is then asymmetrical as to peening stresses.

Or the ring may be hammered or peened on its inner, curved circumferential face symmetrically as at $6^b$ with respect to the middle plane YY of the ring as in Fig. 9 and a portion of the ring removed along one of its quadrant zones, corresponding to any one of the four quadrants D, E, F, G, indicated in Fig. 9. The meeting line of the four quadrant zones is substantially the circumferential neutral axis of the ring. The ring will be then asymmetrical in cross section and therefore in shape. Or metal may be removed from two non-adjacent zones or quadrants as for example quadrants D, G and E, F. Care should be taken not to remove metal from two adjacent zones as for example F, D, in which the metal is under compression and under tension respectively, or from D, E, in which the metal is under similar stresses of compression or extension. This would distort the ring non-uniformly and would produce a reverse or non-uniform twist. In each case illustrated in Figs. 7 and 9, the ring will have a predetermined twist due to stresses imparted to the ring by the symmetrical peenings which are unbalanced because of the removal of the metal in the quadrant zones indicated. This twist will urge the ring contacting edge against the cylinder wall when in place. The direction of the twist but not the axis is indicated diagrammatically by the circular arrow V in Figs. 7, 8 and 9. The preferred order of the steps of my process is first hammering, preferably to one side of the middle plane of the ring, then notching the ring circumferentially in a quadrant zone, then pressing the ring between dies so as to standardize the width of the ring, marking the ring to indicate the point of split and then splitting the ring at the point. The ring is of slightly less diameter than the containing chuck before hammering as shown in Fig. 2. By hammering the ring before splitting, the difficulty is avoided that with a ring, when hammering after splitting, the twist thereby produced in the ring tends to shift the ring with relation to the hammer point so that the hammer blows are not uniformly displaced to one side of the middle plane of the ring. By hammering before splitting, the solid ring does not have points that twist and the zone of the hammering will be displaced the correct uniform amount around the ring.

It will be understood that the invention is not limited to details and that numerous changes may be made in carrying it into effect without departing from the principle thereof.

I claim:

1. A divided piston ring of substantially uniform rectangular radial cross section, condensed on both sides of the middle plane of the ring to exert uniform radial outward pressure, the condensations existing to a greater degree on one side of the middle plane of the ring than the other, whereby unbalanced stresses are introduced into adjacent annular portions.

2. A ring asymmetrically condensed upon one of its circumferential curved faces on both sides of the middle plane of the ring, so as to exert substantially uniform pressure in all radial directions when confined in a circular form and so that the ring assumes a uniform, transverse twist when so confined.

3. A ring condensed upon its inner circumference, so as to exert substantially uniform pressure in all radial directions when confined in a circular form, the condensations being more to one side of the middle plane of the ring than the other, so that the ring assumes a uniform, transverse twist when so confined.

4. A divided concentric piston ring peened on its inner circumferential face to exert substantially uniform radial outward pressure and provided with a circumferential notch at one side of the middle plane of the ring, the ring thereby receiving a variable twist while in its free state, varying from a maximum per unit of length opposite the split to a minimum per unit of length at the split.

5. A concentric piston ring peened on its inner circumferential face to exert substantially uniform radial outward pressure, the peening being to a greater degree on one side of the middle plane of the ring than the other and the ring being provided with an oil scraping edge in the more heavily peened half of the ring, the ring tending to twist transversely when confined to circular form.

6. An expanding concentric divided piston ring of elastic metal peened on its inner circumferential face around its entire circle, along its inner side and toward the adjacent ring face; whereby the resilience of its peened metal tends to lengthen the circumference of the compressed portion and thus throw the corresponding portion of the ring outwardly beyond the peened portion.

7. The process of producing metal piston rings giving radial outward pressure and having a twist, which consists in condensing the inner circumferential curved face of a solid ring more at one side of its middle plane than the other by varying the condensations in such a manner that the ring when confined to circular shape exerts substantially equal radial outward pressure and then splitting the ring at one predetermined point.

8. The process of producing metal piston rings giving radial outward pressure and having a twist, which consists in peening the inner circumferential, curved face of a solid ring more at one side of its middle plane than the other by varying the peening in such a manner that the ring when confined to circular shape exerts substantially equal radial outward pressure, notching the ring circumferentially and splitting the ring at one predetermined point.

9. Steps in the process of producing concentric piston rings exerting substantially equal radial outward pressure and having a predetermined twist, which consist in peening the inner circumference of a solid concentric ring by varying the peening in such a manner that the ring when confined to circular shape exerts substantially equal radial outward pressure, removing metal circumferentially from one of the non-adjacent quadrant zones of the peened ring so as to form a circumferential notch, the result of said peening and notching being to produce an increased localized pressure per unit of width at the bearing edge of the ring.

10. As a new article of manufacture, a piston ring having indentations on its inner periphery, condensed more on one side of its middle plane than the other.

11. As a new article of manufacture, a piston ring having its oil side formed with a reduced annular portion, and its inner periphery condensed so as to force said side outwardly.

12. A new and useful method of making piston rings, which consists in so condensing said ring between the flat sides of the ring, on both sides of, and offset with respect to, the middle plane of the ring as to distort the oil side of the ring.

13. The new and useful method of making piston ring, which consists in reducing the cross-sectional area of said ring on one side of its middle plane, and imparting density to the metal on the inside of the ring and on both sides of the middle plane, greater density being imparted to the reduced section so as to give said ring a tendency to turn inside out.

14. A divided piston ring of substantially uniform rectangular radial cross-section condensed on both sides of the middle plane of the ring to exert uniform radial outward pressure, the condensations lying inside of the neutral axis of the ring and being shifted to one side of the middle plane of the ring, whereby unbalanced stresses are introduced into adjacent annular portions of the ring.

15. An expanding, divided, concentric condensed piston ring of elastic metal condensed around the ring so as to give it radial pressure, the condensations being so located within the ring on its inner circumferential face and on both sides of the middle plane so as to give it a twist about the circumferential neutral axis of the ring.

In testimony whereof, I have signed my name to this specification.

ROBERT B. WASSON.